(12) United States Patent
Meier

(10) Patent No.: US 9,218,665 B2
(45) Date of Patent: Dec. 22, 2015

(54) METHOD FOR DETERMINING THE POSE OF A CAMERA AND FOR RECOGNIZING AN OBJECT OF A REAL ENVIRONMENT

(71) Applicant: Peter Meier, Munich (DE)

(72) Inventor: Peter Meier, Munich (DE)

(73) Assignee: Metaio GmbH, Munich (DE)

( * ) Notice: Subject to any disclaimer, the term of this patent is extended or adjusted under 35 U.S.C. 154(b) by 0 days.

(21) Appl. No.: 14/329,547

(22) Filed: Jul. 11, 2014

(65) Prior Publication Data

US 2014/0321708 A1    Oct. 30, 2014

Related U.S. Application Data

(63) Continuation of application No. 13/502,959, filed as application No. PCT/EP2010/063589 on Sep. 16, 2010, now Pat. No. 8,837,779.

(30) Foreign Application Priority Data

Oct. 19, 2009    (DE) .......................... 10 2009 049 849

(51) Int. Cl.
*G06K 9/00* (2006.01)
*G06T 7/00* (2006.01)
(Continued)

(52) U.S. Cl.
CPC ............ *G06T 7/004* (2013.01); *G06K 9/00624* (2013.01); *G06K 9/3216* (2013.01); *G06T 7/0024* (2013.01); *G06T 7/0028* (2013.01); *G06T 7/2033* (2013.01); *G06T 2207/10012* (2013.01); *G06T 2207/30232* (2013.01); *G06T 2207/30244* (2013.01)

(58) Field of Classification Search
None
See application file for complete search history.

(56) References Cited

U.S. PATENT DOCUMENTS

| 4,700,307 | A  | 10/1987 | Mons et al.  |
|-----------|----|---------|--------------|
| 7,023,536 | B2 | 4/2006  | Zhang et al. |
| 7,038,846 | B2 | 5/2006  | Mandella     |

(Continued)

FOREIGN PATENT DOCUMENTS

| CN | 101004748 | 7/2007  |
|----|-----------|---------|
| CN | 101285686 | 10/2008 |

(Continued)

OTHER PUBLICATIONS

Zhou, ZhiYing, et al. "Robust pose estimation for outdoor mixed reality with sensor fusion." Universal Access in Human-Computer Interaction. Applications and Services. Springer Berlin Heidelberg, 2009. 281-289.*

(Continued)

*Primary Examiner* — Nirav G Patel
(74) *Attorney, Agent, or Firm* — Blank Rome LLP

(57) ABSTRACT

A method for determining the pose of a camera relative to a real environment includes the following steps: taking at least one image of a real environment by means of a camera, the image containing at least part of a real object, performing a tracking method that evaluates information with respect to correspondences between features associated with the real object and corresponding features of the real object as it is contained in the image of the real environment, so as to obtain conclusions about the pose of the camera, determining at least one parameter of an environmental situation, and performing the tracking method in accordance with the at least one parameter. Analogously, the method can also be utilized in a method for recognizing an object of a real environment in an image taken by a camera.

11 Claims, 11 Drawing Sheets

(51) Int. Cl.
*G06K 9/32* (2006.01)
*G06T 7/20* (2006.01)

(56) References Cited

U.S. PATENT DOCUMENTS

| | | | |
|---|---|---|---|
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl |
| 7,268,956 | B2 | 9/2007 | Mandella |
| 7,474,809 | B2 | 1/2009 | Carl et al. |
| 7,729,515 | B2 | 6/2010 | Mandella et al. |
| 7,768,534 | B2 | 8/2010 | Pentenrieder |
| 7,826,641 | B2 | 11/2010 | Mandella et al. |
| 7,889,193 | B2 | 2/2011 | Platonor et al. |
| 7,961,909 | B2 | 6/2011 | Mandella et al. |
| 8,005,261 | B2 | 8/2011 | Baur et al. |
| 2003/0025714 | A1 | 2/2003 | Ebersole et al. |
| 2004/0090444 | A1 | 5/2004 | Satoh |
| 2005/0168437 | A1 | 8/2005 | Carl et al. |
| 2005/0231419 | A1 | 10/2005 | Mitchell |
| 2006/0120568 | A1* | 6/2006 | McConville et al. ......... 382/115 |
| 2007/0110338 | A1 | 5/2007 | Snavely et al. |
| 2008/0109184 | A1 | 5/2008 | Aratani et al. |
| 2008/0284864 | A1 | 11/2008 | Kotake et al. |
| 2009/0041340 | A1 | 2/2009 | Suzuki et al. |
| 2009/0185746 | A1 | 7/2009 | Mian et al. |
| 2009/0190798 | A1 | 7/2009 | Lee et al. |
| 2009/0324026 | A1 | 12/2009 | Kletter |
| 2010/0208941 | A1 | 8/2010 | Broaddus et al. |
| 2010/0259546 | A1 | 10/2010 | Yomdin et al. |
| 2010/0329513 | A1 | 12/2010 | Klefenz |
| 2011/0227915 | A1 | 9/2011 | Mandella et al. |
| 2012/0038549 | A1 | 2/2012 | Mandella et al. |
| 2012/0195471 | A1 | 8/2012 | Newcombe et al. |
| 2013/0113936 | A1* | 5/2013 | Cohen et al. ............... 348/148 |
| 2013/0194418 | A1 | 8/2013 | Gonzalez-Banos et al. |
| 2013/0195362 | A1 | 8/2013 | Janky et al. |

FOREIGN PATENT DOCUMENTS

| | | |
|---|---|---|
| DE | 202006020299 | 5/2008 |
| EP | 1544795 | 6/2005 |

OTHER PUBLICATIONS

Susuki et al. Extrinsic Camera Parameter Estimation from a Still Image Based on Feature Landmark Database, TVRSJ, vol. 13, No. 2, pp. 161-170, 2008.
Office action for JP2012-533534 dated Jul. 23, 2013.
Office action for CN 201080057475.4 dated May 6, 2014.
Zhiying Zhou et al. "Robust Pose Estimation for Outdoor Mixed Reality with Sensor Fusion", Jul. 19, 2009, Universal Access in Human-Computer Interaction, Applications and Services, pp. 281-289.
Wixon L. et al. "Improved illumination assessment for vision-based traffic monitoring", Visual Surveillance, Jan. 1, 1997, pp. 34-41.
Mark R. Stevens et al. "Precise Matching of 3-D Target Models to Multisensor Data", IEEE Transactions Image Processing, vol. 6, No. 1, Jan. 1, 1997.
Battle J. et al. "A review on strategies for recognizing natural objects in colour image of outdoor scenes", Image and Vision Computing, Jan. 1, 2000, pp. 515-530.
Cathala T. et al. "Real time simulation tools in the CHORALE workshop", Proceedings of the SPIE, Jan. 1, 2006.
Narasimhan S.G. et al. "All the images of an outdoor scene", Lecture Notes in Computer Science, Jan. 1, 2002.
Bernhard Reitinger et al. "Augmented Reality Scouting for In-teractive 3D Reconstruction", Virtual Reality Conference, 2007, Mar. 1, 2007.
Akbarzadeh A. et al. "Towards Urban 3D Reconstruction from Video", 3D Data Processing, Visualization, and Transmission, Jun. 1, 2006, pp. 1-8.
Tsz-Wai Rachel Lo et al. "Local feature extractin and matching on range images: 2.5D SIFT", Computer Vision and Image understanding, vol. 113, No. 12, Aug. 18, 2009.
Feiner et al. "A Touring Machine: Prototyping 3d Mobile Augmented Reality Systems for Exploring the Urban Environment", Proceedings of the 1st International Symposium on Wearable Computers, pp. 74-81, 1997.
Henrich et al. "AR Weather", Mixed and Augmented Reality, 2008, pp. 187-188.

* cited by examiner

Preparation of intersection model

```
30.0 Loading of several existing
data models with distance in
feature vector
           │
           ▼
31.0 Identification of very similar
feature descriptors that occur in
several models and recording the
frequency of occurrence per
feature
           │
           ▼
32.0 Sorting out
outliers remaining
identical, though
in the descriptor,
but not in the
place
           │
           ▼
33.0 Generating a map
containing a maximum number of
features per volume, with
frequent features (frequency
from 31) being selected first
           │
           ▼
34.0 Providing for
4.0
```

Fig. 7

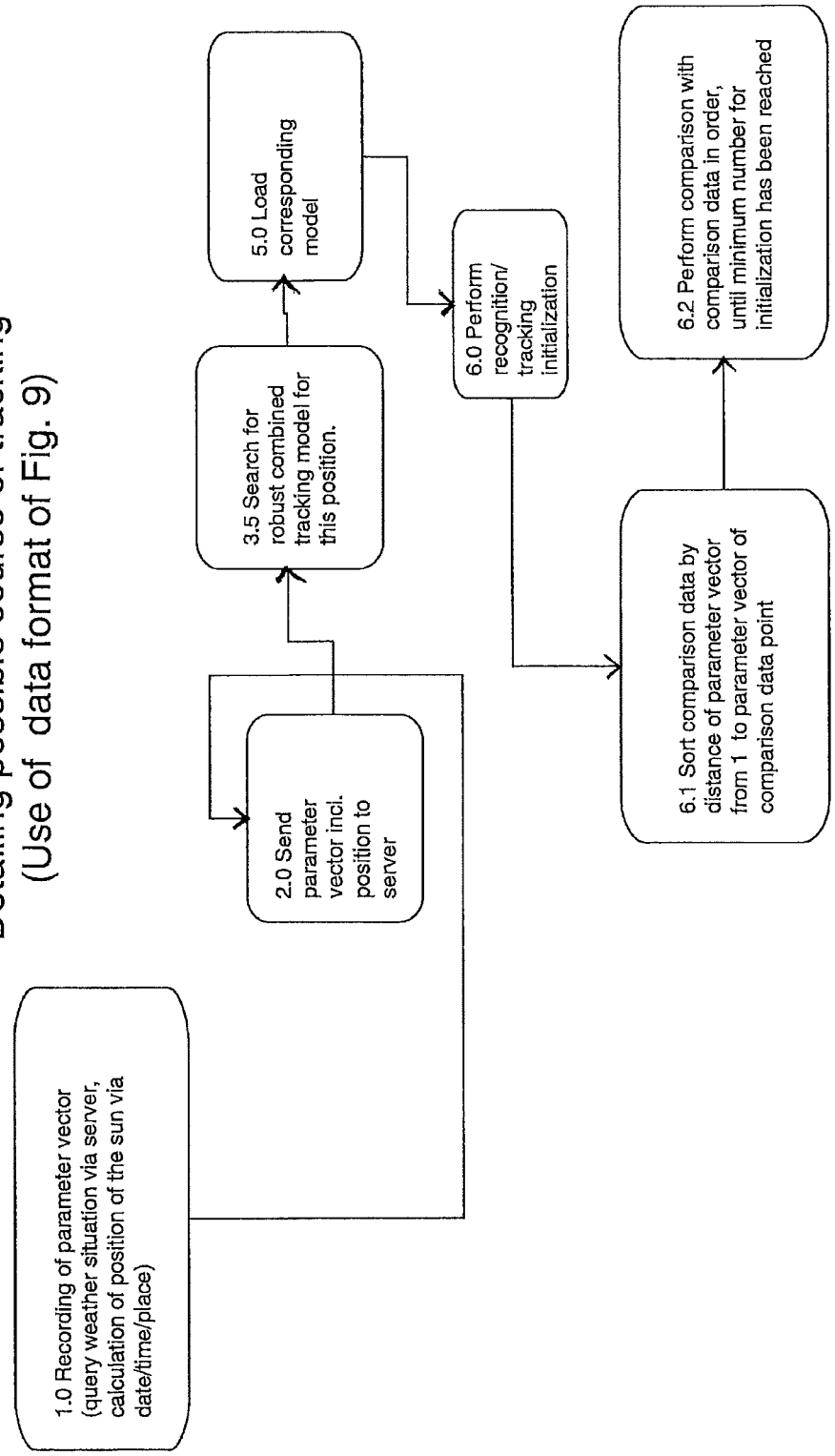

Parameter vector (each parameter may contain regions, e.g. 0.1-0.5)

Method index (e.g. SIFT or SURF or FAST + Descriptor)

Descriptor

Optionally optimization information (e.g. 3D position for 2d-3d and 3d-3d optimization, 2D position for 2d-2d optimization) for pose calculation

Fig. 9

| View 3.1.2009 | View 3.5.2009 | Absolute difference | Weighting | Diff. according to weighting | Diff. according to weighting and standardization (weighting factors) |
|---|---|---|---|---|---|
| 0.4 | 0.8 | 0.4 | 3 | 1.2 | 0.2 |
| 1 | 0.76 | 0.24 | 1 | 0.24 | 0.04 |
| 0.00821918 | 0.43287671 | 0.424657534 | 2 | 0.849315068 | 0.141552511 |
| | | | Sum | | 0.381552511 |
| | | | Standardized (Number of parameters) | | 0.12718417 |

Fig. 11

METHOD FOR DETERMINING THE POSE OF A CAMERA AND FOR RECOGNIZING AN OBJECT OF A REAL ENVIRONMENT

This application is a continuation of U.S. patent application Ser. No. 13/502,959 filed May 14, 2012 which is entitled to the benefit of, and incorporates by reference essential subject matter disclosed in PCT Application No. PCT/EP2010/063589 filed on Sep. 16, 2010, which claims priority to German Application No. 10 2009 049 849.4 filed Oct. 19, 2009.

BACKGROUND OF THE INVENTION

1. Technical Field

The present invention relates to a method for determining the pose of a camera relative to a real environment and to a method for recognizing an object of a real environment in an image taken by a camera. Furthermore, the invention relates to a method for providing a data model that is intended to be compared with data of an image taken by a camera in a method for determining the pose of a camera relative to a real object of a real environment or in a method for recognizing an object of a real environment.

2. Background Information

Augmented Reality (AR) is a technology in which virtual data are overlaid with reality and which thus facilitates the association of data with reality. The use of e.g. mobile AR systems is already known in the prior art. In the past years, high-performance mobile devices (e.g. so-called smartphones) turned out to be suitable for AR application. These devices meanwhile have comparatively large color displays, installed cameras, good processors and additional sensors, such as e.g. orientation sensors and GPS. In addition thereto, the position of the device can be approximated via radio networks. In the past, there were various projects implemented on mobile devices using AR. At first, there were used special optical marks for ascertaining the position and orientation of the device. In more recent times, there are also approaches to utilize GPS and the orientation sensor systems of more modern devices. (AR Wikitude. http://www.mobilizy.com/wikitude.php.; S. Feiner, B. MacIntyre, T. Hollerer, and A. Webster. A touring machine. Prototyping 3d mobile augmented reality systems for exploring the urban environment. In Proceedings of the 1st International Symposium on Wearable Computers, pages 74-81, 1997; Sekai Camera. http://www.tonchidot.com/product-info.html; Marko Heinrich, Bruce H. Thomas, Stefan Mueller, "AR Weather," Mixed and Augmented Reality, IEEE/ACM International Symposium on, pp. 187-188, 2008 7th IEEE/ACM International Symposium on Mixed and Augmented Reality, 2008; layar.com).

However, it is noticeable in this regard that the registration, i.e. the accuracy of overlaying is worthy of improvement due to unsafe sensor data. An approach to this end is the use of hybrid tracking that improves initial poses of the camera from the combination of e.g. GPS, compass and gravitation sensors by optical approaches. Often, so-called "histogram equalization" of the image data is employed in order to reduce the susceptibility to varying light conditions.

Object recognition of a real object in an image taken by a camera and initialization of optical tracking systems for determining the camera pose relative to a real environment are known in the prior art. However, the reliability of the systems may occasionally vary greatly with varying environmental conditions. The camera pose in this regard is the position and orientation of the camera in space. The reality may be present e.g. in any form as data model, for example as 3D model describing the geometric properties of the reality or part of the reality.

The publication US 2003/0025714 describes a system visualizing weather data by means of augmented reality. The publication US 2005/0231419 A1 describes an AR system that monitors the airspace by means of weather-independent sensors and displays airspace information by means of AR.

SUMMARY OF THE INVENTION

It is the object of the invention to improve the robustness to changing environmental conditions in a method for determining the pose of a camera relative to a real environment and in a method for recognizing an object of a real environment in an image taken by a camera.

In accordance with a first aspect, the invention relates to a method for determining the pose of a camera relative to a real environment, said method comprising the following steps: taking at least one image of a real environment by means of a camera, the image including at least part of a real object, determining at least one parameter of an environmental situation, e.g. when taking the image, performing a tracking method that evaluates information with regard to correspondences between features associated with the real object and corresponding features of the real object as it is contained in the image of the real environment, in order to obtain conclusions about the pose of the camera, and performing the tracking method in accordance with the at least one parameter.

In accordance with a further aspect, the invention relates to a method for recognizing an object of a real environment in an image taken by a camera, said method comprising the following steps: taking at least one image of a real environment by means of a camera, the image including at least part of a real object, performing an image recognition method providing information with respect to the recognition of the at least one real object in the image, determining at least one parameter of an environmental situation, e.g. when the image is taken, and performing the image recognition method in accordance with the at least one parameter.

In particular, it is possible in this manner to recognize the current environmental situation and to configure the systems dynamically. By way of the matched configuration, the robustness with respect to changing environmental conditions is enhanced.

In accordance with an embodiment of the invention, the determination of the at least one parameter of the environmental situation is made using at least one or several of the following items of information: time of the day; time of the year; weather, in particular rain, clouds, sun (solar radiation) and fog; position of the moon; snow conditions; foliage of the trees; altitude above sea level; public events, in particular strong movements; traffic situation; position; orientation in a world coordinate system; histogram of the image; temperature; maintenance step. The at least one parameter of the environmental situation can be characteristic in particular for one or more of these conditions or situations.

Various environmental conditions, as pointed out in an exemplary manner hereinbefore, often have great influence on the aforementioned methods for object recognition and pose determination. When these conditions are recognized, it is possible to react accordingly. A reaction could be, for example, to prepare a data model of the environment for most of the positions of the sun, and to do so for rainy weather and sunny weather each. When it is desired to perform a recognition or initialization at a particular location, it is possible, e.g. by way of the time of the day/year and the query of online weather information, to load and make use of an appropriate data model (in which the angle between the vector of solar radiation and the vector of the calculated solar radiation is as small as possible). In general, there are thus one or more parameters measured, simulated or determined that describe at least part of the environmental conditions. It is possible to determine or derive from this one or more parameters which configure the recognition or initialization system for object recognition and pose determination, respectively.

In an embodiment of the invention, the tracking method employs at least one optical tracking method that is initialized in accordance with the at least one parameter.

For example, the pose of the camera is determined by means of the tracking method with one, two, three, four, five or six degrees of freedom.

In an embodiment of the invention, the tracking method can make use of several tracking sensors that are different with respect to the sensor type. For example, the tracking method includes weighing of at least one of the tracking sensors in accordance with the at least one parameter.

In an embodiment of the invention, the tracking method can also include a prioritization of method partial steps in accordance with the at least one parameter. However, it is also possible as an alternative or in combination therewith is a method making use of a data model that is compared with data of the image taken by the camera, to select the data model in consideration of the at least one parameter of the current environmental situation. In a further embodiment, there is used at least one data model that is compared with data of the image of the real object in the image of the real environment, with the at least one parameter having influence on the preparation and/or the use of the data model.

For example, the at least one parameter has influence on the kind of preparation of the data model, in particular the preparation of so-called feature detectors and descriptors. In a further embodiment, a data model is extracted from a number of individual models which were recorded with the at least one parameter (environmental situation) or prepared by simulation, the data model containing an intersection of items of information that are present in several environmental situations.

The invention also relates to a method for providing a data model that is intended to be compared with data of an image taken by a camera in a method for determining the pose of a camera relative to a real object of a real environment or in a method for recognizing an object of a real environment. In accordance with such a method, an environmental situation is ascertained or simulated, and at least one parameter of the environmental situation is determined. Furthermore, there is prepared a data model containing a basic description of the real object, various environmental situations are set or simulated and, for different environmental situations, a respective matched data model is provided in accordance with the respective at least one parameter (this can take place e.g. as a direct reaction on the current parameters or as a reserve, e.g. when most of the situations are to be simulated in advance).

According to an embodiment, the basic description is a virtual 3D model of an environment.

According to a further embodiment, a data model is prepared that contains an intersection of items of information that are present in several different environmental situations.

For example, when virtual information is blended into a view of a real environment, weather data can be considered which are retrieved e.g. via the Internet ("online") in order to increase the degree of reality of blended in virtual information with respect to the real environment and thus improve association. There are various degrees of complexity conceivable here for processing. For example, on the basis of the weather situation, there may be assigned fixed lighting models or materials (e.g. textures) matched to the weather situation. In accordance with the weather data (such as e.g. clouds, solar radiation etc.) and/or other data (such as e.g. time of the day/year etc.), shadows cast or light conditions can be calculated (e.g. by the raytracing method known to those skilled in the art).

Additional advantageous developments and embodiments of the invention are indicated in the dependent claims.

BRIEF DESCRIPTION OF THE DRAWINGS

The invention will be explained in more detail hereinafter by way of the figures illustrated in the drawings in which:

FIG. 7 shows an exemplary course of a method according to a further embodiment of the invention, FIG. 8 shows an exemplary course of a method according to a further embodiment of the invention, FIG. 9 shows an exemplary setup of a data structure according to an embodiment of the invention, FIG. 11 shows approximate, exemplary values and a possible calculation of the difference of images taken in accordance with an embodiment of the invention.

DETAILED DESCRIPTION OF THE INVENTION

Figure 1:
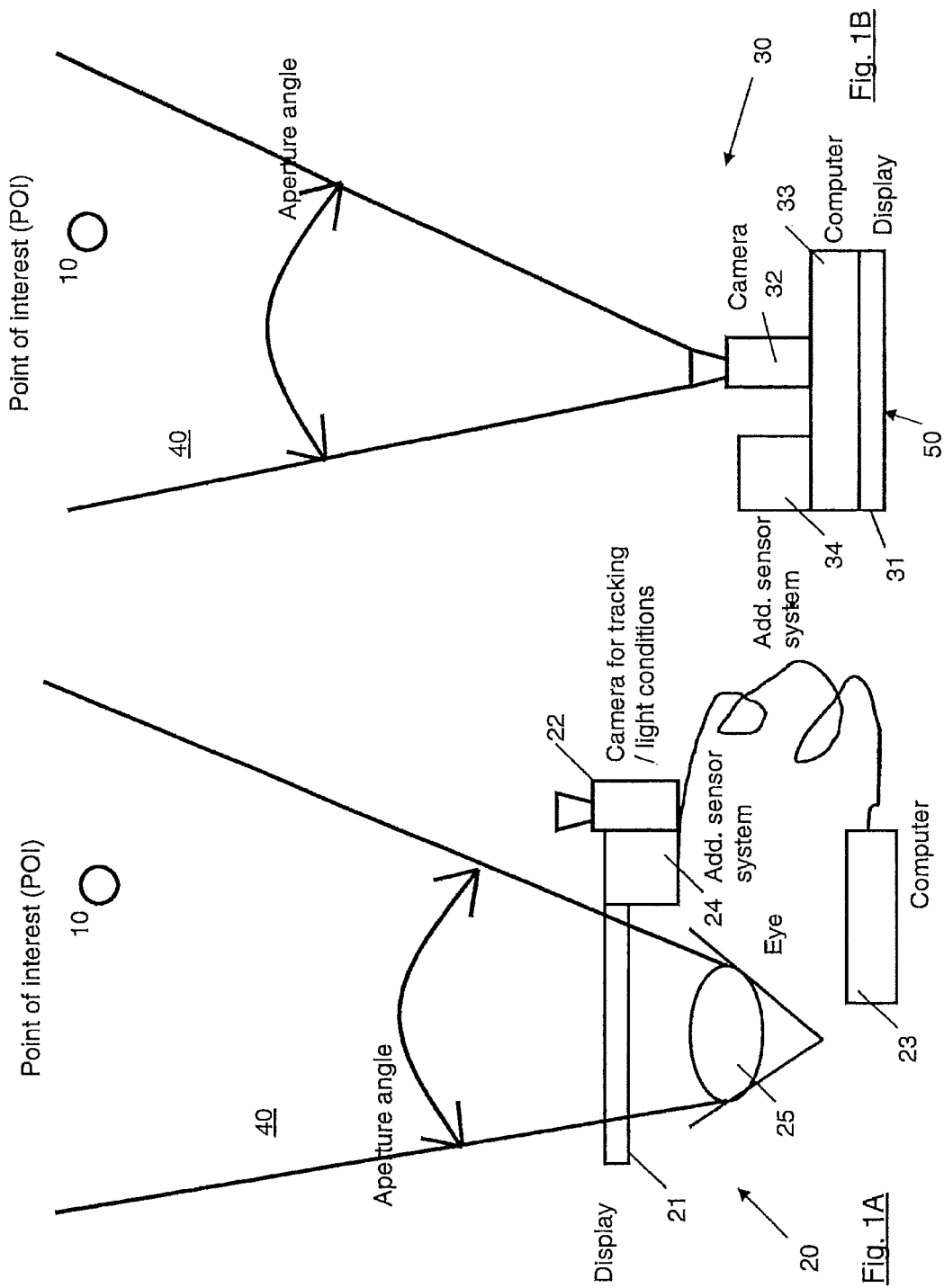
FIG. 1 shows a plan view of a schematic arrangement of exemplary system set-ups with respect to a real environment, which can be used for performing a method according to the invention.
Figure 2:
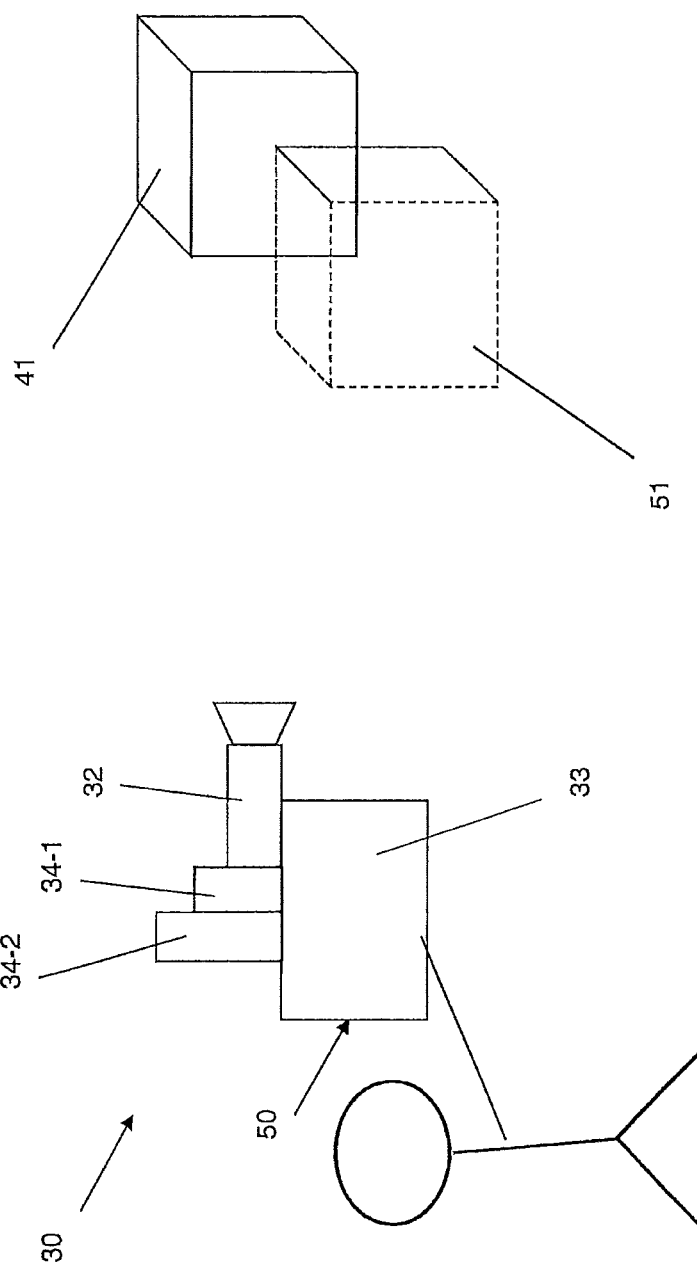
FIG. 2 shows a side view of a schematic arrangement of an exemplary system setup with respect to a real environment, which can be used for performing a method according to the invention.

FIG. 1 shows in a plan view a schematic arrangement of exemplary system setups with respect to a real environment, which can be used for performing a method according to the invention. In particular, FIG. 1 shows various possibilities of a system setup. In connection with this, FIG. 2 shows a side view of a schematic arrangement of an exemplary system setup with respect to a real environment, which can be used for performing a method according to the invention.

In the illustration of FIG. 1A, the user wears, as display device, a head mounted display system ("Head Mounted Display", abbreviated to HMD) comprising a display 21 that is part of the system setup 20. The display 21 e.g. may be generally known semi-transparent data glasses ("optical see-through display"), in which virtual information provided by a computer 23 can be blended in. The user then sees, in a view of the real world 40 through the semi-transparent data glasses 21, objects of the real world 40 augmented with blended in virtual information (such as e.g. POI objects related to the real world). In this manner, the system setup 20 constitutes a first embodiment of a generally known augmented reality (AR) system.

The display 21 may have additional sensors 24, such as rotation sensors, and a camera 22 for optical tracking mounted thereon. Display 21 can be semi-transparent or may be fed with images of the reality by a camera image. With a semi-transparent display 21, calibration between eye 25 and display 21 is necessary. In this regard, there are various processes documented in the prior art and known to those skilled in the art. Advantageously on display 21 or anywhere on the user's body or also in computer unit 23, there may also be installed position sensors, such as e.g. GPS sensors (GPS: Global Positioning System) for rendering possible a geographic position determination of the system setup 20 (e.g. in accordance with longitude and latitude) in the real world 40.

The illustration of FIG. 1B shows another exemplary system setup 30 that can be found often e.g. in modern mobile telephones (so-called "smartphones"). Display device 31 (e.g. in the form of a display screen or display), computer 33, sensors 34 and camera 32 constitute a system unit that is accommodated e.g. in a common housing of a mobile telephone. There may be used several tracking sensors that are different with respect to the sensor type. For example, a rotation sensor 34-1 and a GPS sensor 34-2 (cp. FIG. 2) can be used and evaluated in combination.

The view of the real environment 40 is provided by display 31 showing a camera image 50 of the real environment 40 captured by camera 32. For augmented reality applications, the camera image 50 can be shown on display 31 and augmented with additional virtual information (such as POI objects related to the real world). In this manner, the system setup 30 constitutes another embodiment of a generally known augmented reality (AR) system.

Basically, the present invention can be used expediently for all forms of AR. For example, it is of no relevance whether the representation is implemented in the so-called optical see-through mode with semi-transparent HMD or in the video see-through mode with camera and display screen. The invention basically can also be used in connection with stereoscopic displays, in which the video see-through approach advantageously uses two cameras each for recording one video stream per eye. In any situation, the items of virtual 3D information can be calculated individually for each eye.

The processing of the different partial steps described hereinafter basically can be distributed to various computers via a network. Thus, a client/server architecture or a purely client-based solution is possible (in which e.g. various data model alternatives are fixedly provided on the server). For example, the client could send an image to a server which, on the basis of the image and on the basis of parameters of the environmental situation, makes available to the client statements on the 3D position and 3D orientation of the system setup (cp. FIG. 1) or part thereof in relation to the real world (referred to as pose in the following) and on the range of vision or visibility. The parameters concerning the environmental situation can be determined in part by the client (e.g. position) and in part by the server (weather data for this position). Moreover, the client or the server may also comprise several computing units, such as several CPUs or specialized hardware components, such as generally known FPGAs, ASICs, GPUs or DSPs. There may also be several clients that mutually exchange information that is generated e.g. with respect to the environmental situation at this location, or in case a client generates environmental data. This exchange of information can take place via a server, however, direct connections e.g. via Bluetooth or WLAN would be conceivable as well.

For permitting AR to be realized, the pose (position and orientation) of the camera in space is necessary. This can be realized in variety of different ways. It is possible to determine the pose in the world e.g. by using merely GPS and an orientation sensor with electronic compass (as installed e.g. in some modern mobile telephones). However, the uncertainty of the pose then is very high. Thus, it is also possible to use other methods, such as e.g. optical initialization and tracking or the combination of optical methods with GPS and orientation sensors. WLAN locating can be used as well or RFIDs or optical markers can support the locating process. As mentioned hereinbefore, a client/server-based approach is possible here as well. However, the present invention basically is not restricted to the use for AR only. For example, it is also possible to perform object recognition and then start a website in a web browser or an application. However, it is also possible to use the at least one parameter and the photo in order to exactly position the image on a photo site, such as Flicks, which can also indicate the place where the images have been taken.

The invention is capable of improving the information representation for the client. However, it can also be used in a remote scenario. In this context, e.g. a maintenance expert in a control room sees on his display screen the image of the client transmitted via the data network as well as the correspondingly processed information. The expert then could give the client instructions or merely observe. In a similar scenario it is conceivable that a person views captured image or video material with interactive additional information displayed in accordance with the invention and, if possible, can navigate through the material similar to the Internet-based application "Google Streetview".

In addition thereto, the invention can also be installed, or carried along, in vehicles, aircraft or ships, making use of a monitor, HMD or a head-up display.

Basically, the invention can be used for blending in so-called points of interest. A point of interest ("POI") can be set up for a large variety of different forms of information. Examples are given hereinafter: It is possible to represent images of places using GPS information. It is possible to automatically extract information from the Internet. For example, this may be company or restaurant websites with addresses or pages giving ratings. Users can deposit texts, images or 3D objects at specific locations and make the same available to others. Information pages, such as Wikipedia, can be searched for geo-information, and the pages can be made accessible as POI. POIs can be generated automatically from the search and browsing behavior of the users of mobile devices. It is possible to show other places of interest, such as underground transportation or bus stations, hospitals, police stations, physicians, real estate ads or fitness clubs.

The system also permits navigation information to be displayed (e.g. arrows).

As described above, FIG. 2 schematically illustrates a side view of a schematic arrangement of an exemplary system setup with respect to a real environment, which can be used for performing a method according to the invention. For example, FIG. 2 shows an exemplary system setup 30 that includes sensors (e.g., a rotation sensor 34-1 and a GPS 34-2), camera 32, computer 33 having a display 31 (e.g., see FIG. 1B) for showing a camera image 50. Also as schematically illustrated in FIG. 2, the reality may be present in any form as a data model, e.g. as a 3D model 51 which in the instant case circumscribes the geometric properties of a real object 41 or stores point features of the object in a 3D point cloud. Such a data model thus can describe the geometric properties of reality or part of the reality in general. Such a data model can be utilized in a tracking method for determining the camera pose or in a method for object recognition.

For example, a method for optical object tracking can be carried out utilizing such a data model. In doing so, as is known to those skilled in the art, a data model, such as e.g. data model 51, is compared with data of the image taken by the camera, which includes the real object 41.

Object recognition of a real object in an image taken by a camera and initialization of optical tracking systems for determining the camera pose relative to a real environment are known in the prior art. In particular, the methods used in this context that evaluate information with respect to correspondences between features associated with the real object and corresponding features of the real object as it is contained in the image of the real environment, so as to obtain conclusions about the pose of the camera.

However, the reliability of the systems may greatly vary occasionally with changing environmental conditions. By means of the invention, it is possible to recognize the current environmental situation and to configure the systems dynamically. By way of the matched configuration, the robustness with respect to changing environmental conditions will be enhanced.

In accordance with an aspect of the invention, the following steps are carried out: taking at least one image of a real environment by means of a camera, the image containing at least part of a real object, determining at least one parameter of an environmental situation, performing a tracking method that evaluates information with respect to correspondences between features associated with the real object and corresponding features of the real object, as it is contained in the image of the real environment, so as to obtain conclusions about the pose of the camera, and performing the tracking method in accordance with the at least one parameter, in particular finding correspondences already in accordance with the at least one parameter. It is thus possible to recognize the current environmental situation and to dynamically configure the systems. By way of the matched configuration, robustness is enhanced.

For example, the tracking method makes use of at least one optical tracking method that is initialized in accordance with the at least one parameter. The pose of the camera is determined e.g. with one, two, three, four, five or six degrees of freedom by means of the tracking method. The intended use is, for example, the recognition of objects (e.g. for obtaining the information: "in front of which object am I") or the initialization of optical tracking systems for augmented reality with six degrees of freedom. For determining six degrees of freedom, a possibility known in the prior art consists in generating 2D-3D correspondences and in entering the same into an optimization method. It is also possible to make use of 3D-3D correspondences, for example, when the recording device is equipped in addition with a depth camera or a second camera for generating depth information. For providing the correspondences, it is possible to recognize features from the image and to retrieve the same in a data model. For retrieval, it is possible to make use of so-called feature descriptors (e.g. SURF or SIFT). SURF stands for Speed Up Robust Features, SIFT stands for Scale Invariant Feature Transform). However, this does often not work when features of the data model and descriptors thereof were generated with respect to other light conditions than the features recognized in the current image.

For example, the tracking method makes use of several tracking sensors that are different with respect to the sensor type. It is then possible in the tracking method, in the so-called sensor fusion, to effect weighting of one or more of the tracking sensors with respect to the other tracking sensors in accordance with the at least one parameter (e.g. increased uncertainty of the optical tracking in case of poor conditions). It is also possible to effect in the tracking method a prioritization of method partial steps in accordance with the at least one parameter. For example, it is possible to use faster approaches (e.g. SURF) first in good conditions, and to use more robust approaches (e.g. SIFT) first in case of poor conditions.

Different environmental conditions often have great influence on the methods and many features. When these are recognized, it is possible to react on the same accordingly. A reaction could be, for example, to prepare a model of the environment for most of the positions of the sun, and to do so for rainy weather and sunny weather each. When recognition or initialization is to be carried out at a specific location, it is then possible to load and make use of an appropriate model (in which the angle between the vector of solar radiation and the vector of the calculated solar radiation is as small as possible), for example by way of the time of the day/year and query of online weather information. Thus, there are parameters that describe the environmental conditions as well as parameters that configure the recognition or initialization system.

An embodiment uses for determining the at least one parameter of the environmental situation one or several of the following items of information: time of the day; time of the year; weather, in particular rain, clouds, sun and fog; position of the moon; snow situations; foliage of the trees; altitude above sea level; public events, and particular strong movements; traffic situation; position; orientation in a world coordinate system; histogram of the image; temperature; maintenance step. The at least one parameter of the environmental situation thus may be characteristic in particular for one or more of these conditions or situations. In an embodiment, the at least one parameter is not (only) the location or not characteristic for the location (only). In a further embodiment, the at least one parameter is not (only) the orientation or not characteristic for the orientation (only). In still another embodiment, the at least parameter is not (only) the pose or characteristic for the pose (only).

In the following, there are further examples and possibilities according to the invention indicated:

As regards the lighting situation, it is also possible to consider the moon. In moonlit nights, it is possible to make use of specific optical features, in dark nights it is possible to work with artificial light sources (e.g. illuminated advertising) only or there are no more attempts made at all to use the optical system, but rather to use e.g. GPS and compass only. When it snowed (current weather or weather database of the last few days and temperature curve or online road traffic report or online avalanche report), the environment is again different, and it would be advantageous to load a corresponding model or to deactivate the optical tracking.

In accordance with the time of the year, it is possible in certain regions to draw conclusions as to the foliage of the trees and to load a different model as well. In addition to the time of the year, the climatic conditions of the year in total can be considered in addition in the calculation. The altitude above sea level can play a role as well in this regard.

Basically, it is not only possible to load different data models in accordance with the particular environmental situation, but also to take influence on a prioritization (earlier or late consideration in the algorithm) or weighting (strong or small influence on the results) of specific model parts within a combined model. In a combined model, individual model data (such as points of a point cloud) are supplemented with data regarding the environmental situation. In accordance with the specific environmental situation, it is thus possible to blend out, vary or add parts of the model data. For example, specific points of a data model are blended out (i.e. not considered) in case of the environmental situation "winter", whereas they are considered in case of the environmental situation "summer". A possible data structure for this possible realization is illustrated in FIG. 9. The data model could contain per feature one parameter vector that describes with which environmental situations the feature can be sensibly used, a descriptor, such as e.g. the SURF descriptor, and optimization information for calculating the pose, such as e.g. the 3D position in the earth's coordinate system.

The position and orientation of the image taking camera often are of great relevance for determining the environmental conditions as well (local weather, local time of the day etc.). However exceptions are recognition processes that may take place all over the world (e.g. recognition of a Coca-Cola bottle) and where the client can react to specific environmental properties irrespective of the position (e.g. brightness sensor on mobile devices or histogram of the camera image). A histogram (a kind of statistics concerning the image) may permit, for example, hints to the general properties of the environmental lighting and can deactivate or switch over an optical method. Switching over of a method could be, for example, the use of edge features instead of corner features or the use of the known SIFT method instead of SURF. Or the user can be requested to intervene helpfully and to provide the system with hints for recognition.

Still further information on the environment in case of an object to be subjected to maintenance, for example, could be derived from the knowledge of the current maintenance step or maintenance status. For example the information, whether the motor has already been removed or not for a specific step.

Even the knowledge of public events or the traffic situation (from experience or retrievable online) could provide hints to the effect that specific regions cannot provide reliable information as they are constantly in motion (e.g. crowds of people or moving vehicles).

Figure 10:
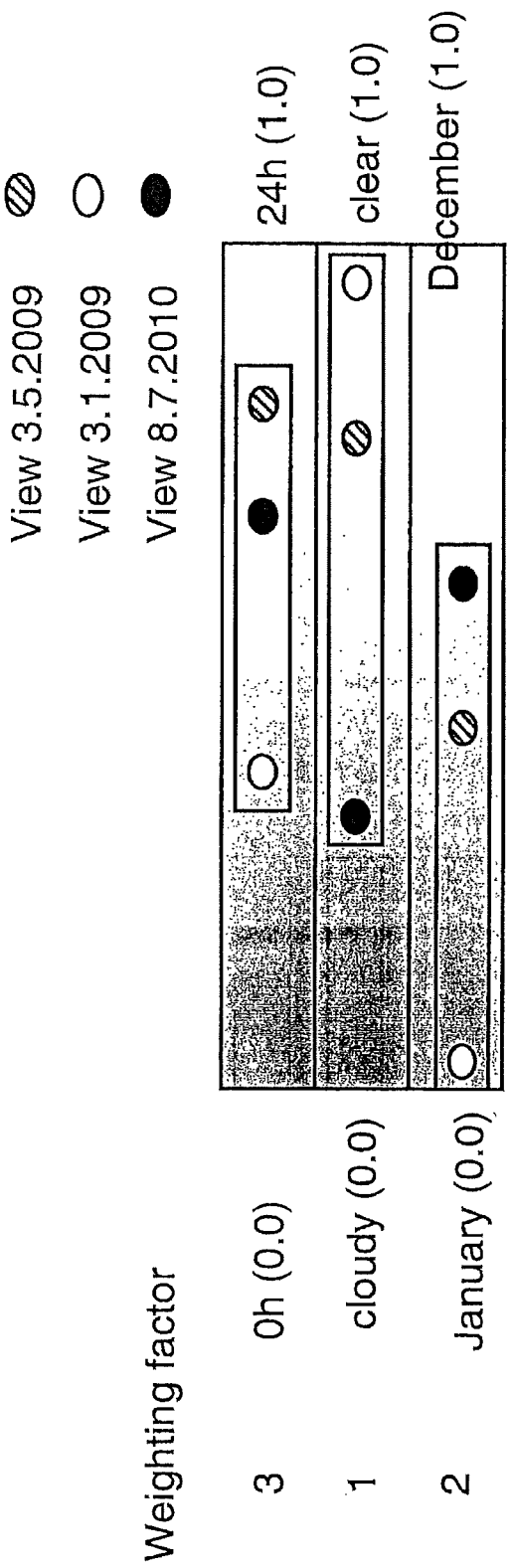
FIG. 10 shows an exemplary parameter vector according to an embodiment of the invention.

A further embodiment includes a calculation of an uncertainty in determining the camera pose from the determination of a distance measure of the at least one parameter of the environmental situation and known ideal parameters of the tracking method with respect to a known environmental situation. In general, it would also be possible to combine part of several parameters on the environmental situation in the form of one vector and to generate data models with a corresponding vector of the recording or preparation conditions. The quality of the data model provided for the current environmental situation could be concluded from a comparison of the vectors, and the data model with the least deviation could be selected accordingly and/or an uncertainty statement for recognition could be derived from the difference. An example in this regard is shown in FIG. 10: the vector contains e.g. three fields for time of the day, cloud situation and time of the year. The ellipses show the environmental situation for views taken at particular times. FIG. 11 shows approximate exemplary values and a possible calculation of the difference between the views. In this regard, weighting of the individual parameters is possible, as these may take influence on the data model to a different extent.

The parameter vector can be stored per data model are also per item of comparison information (e.g. SURF feature) or per feature within the data model. In this regard, not only a fixed value can be stored, but also a parameter range for which this comparison information is suitable. FIG. 8 shows the possible use of this additional information. It would be possible, for example, as described in step 6.1 and 6.2, to accelerate the comparison by sorting in accordance with the parameter vector distance, as the desired number of pairs could be found more rapidly then. As an alternative, the current environmental parameter vector could be placed in front of all features found in the image, and a matching algorithm, optionally supported by nearest neighbor search, could be started then.

In an embodiment of the invention, the at least one parameter has influence on minimum requirements as to successful retrieval of model data, in particular determines a number of features associated with the real object and corresponding features of the real object in the image of the real environment that have been brought into conformity (number at least of "matched" features). In recognition and initialization, there is often a measure indicated that points out as from where retrieval of a feature or of the object in total is assumed. For example, at least 10 features have to be refound or retrieved. When the model present fits the environment well, the measure e.g. can be increased (e.g. 20 features have to be refound). Thus, with good conditions, the so-called "false positives" (false recognitions of an object; i.e. the assumed recognition of an object by the system which, however, turns out to be wrong) (which e.g. may result in enhanced accuracy), while, however, a possible initialization chance is not dispensed with in case of poor conditions.

In a further embodiment, the at least one parameter of the environmental situation has influence on the preparation and/or use of the data model. In particular, the at least one parameter influences the kind of preparation of the data model, e.g. the detection of features and the preparation of feature descriptors. In particular, there are different feature extractors and descriptors. With good environmental conditions, e.g. fast methods (e.g. FAST extractor+a fast descriptor) can be selected, while more complex methods (e.g. SIFT) can be used in case of difficult conditions.

In still another embodiment, a data model is extracted from a number of individual models, with the data model containing an intersection of information present in several environmental situations. The flowchart in FIG. 7 shows an exemplary realization of this process. In step 30.0 there are loaded various existing data models or data models generated before by simulation. Thereafter (step 31.0), matching between the models is performed. In doing so, some comparison data are retrieved often, whereas others may not be retrieved once. The frequency of retrieval can be buffered. In optional step 32.0, outliers can be eliminated, for example when a feature varies greatly in its position in the common coordinate system of the data models. It is to be noted that the data models basically can also consist of heterogeneous comparison information that is created by different methods (e.g. SURF or SIFT or any edge model or area model or a model considering colors). Thereafter, comparison information retrieved very often (step 31.0) can be combined to form a new map. In doing so, an upper limit for comparison information e.g. per volume in space can be determined optionally as well. Sorting in accordance with the strongest comparison information would then take place. In this regard, it can be prevented by a weighting operation that only very robust, slow methods are preferred. Thereafter, the map can be stored for further use.

In another embodiment, there are several partial systems each performing the method (in particular several clients, such as several mobile devices), and not each one of the partial system calculates a tracking situation itself, but rather finished situation information is made available to all partial systems, advantageously even a finished recognition or initialization model is made available to the partial systems.

For example, the partial systems continuously provide information on the situation to a server provided or a peer-topeer process. A peer-to-peer process would take place between several mobile devices (e.g. a server communicates to a device No. 10 that devices No. 13 and No. 17 are nearby and device No. 10 then can ask these devices for information directly). Otherwise, there are individual devices providing information to the server, and a user obtains the information from the server for his particular device.

In another embodiment, determining the camera pose is used for calculating depth information with respect to at least one real object contained in the image, the depth information being used for blending in, in a display device, an occlusion model for occluding a real object when virtual information superimposed on the real environment is occluded in the view by the real object to be occluded.

Another aspect of the invention relates to a method for preparing a data model that is intended to be compared with an image taken by a camera and the data thereof, respectively, in a method for determining the pose of a camera relative to a real object or in a method for recognizing an object of a real environment, in which an environmental situation is determined or simulated and at least one parameter of the environmental situation is determined, a data model is prepared containing a basic description of the real object, various environmental situations are preset or simulated and a respective matched data model is made available for different environmental situations in accordance with the respective at least one parameter. This can take place as a direct reaction to current parameters or as a reserve, e.g. when most of the situations are simulated in advance. Thus, instead of providing several models of different situations with great expenditure, an idea consists in providing a neutral model and, by simulation of the environmental effects, to match the same dynamically (or in advance) and with considerably less expenditure.

For example, the basic description is a virtual 3D model of an environment. It would be conceivable for example, to have a 3D model of a city. One could attempt now, by means of known so-called 3D rendering techniques, to calculate the current path of the sun and the model of the environment resulting therefrom.

For example, the 3D model has textures applied thereto which before were freed from environmental situation-specific properties. While information is collected, it is often possible that shadows are recorded as well. One could try to eliminate these using methods that are known to those skilled in the art.

In an embodiment, the 3D model is projected onto the image plane with different light situations.

Advantageously, there is a data model prepared that contains an intersection of information that is present in several different (as many as possible) environmental situations. It would also be conceivable to generate a large variety of different environmental models (by recording or simulation) and to extract features therefrom that are used for recognition/initialization. It is possible to examine among the environmental models as to whether specific features (e.g. a specific SURF feature) occur in as many as possible different models, and to then pack especially robust features into a model that works in as many situations as possible. Reference is also made to the statements hereinbefore relating to FIG. 7.

An embodiment combines a SLAM method with ascertaining of the current environmental situation, and a data model prepared is stored together with information on the environmental situation. In the so-called Simultaneous Localization and Mapping (SLAM), a map (data model) of the environment is generated (e.g. a map of SURF features and the 3D position thereof in the world), while the camera is in motion or in case of a stereo camera or also directly with a similar 3D approach (e.g. a depth camera), and the pose of the camera is determined. When data or parameters on the current environmental conditions are recorded in addition (as described hereinbefore), these data can be used for generating an ever more complete model set of the world with respect to a large variety of different environmental conditions. For example, a system could be used for starting at a particular location for which comprehensive data are already available, and one could then proceed from this basis. The system then learns new ranges with respect to specific conditions, and in the future can start on the basis of these as well.

In the following, aspects and embodiments of the invention will be elucidated in more detail by way of the flowcharts illustrated in FIGS. 4 to 8 in connection with the other figures.

Figure 4:
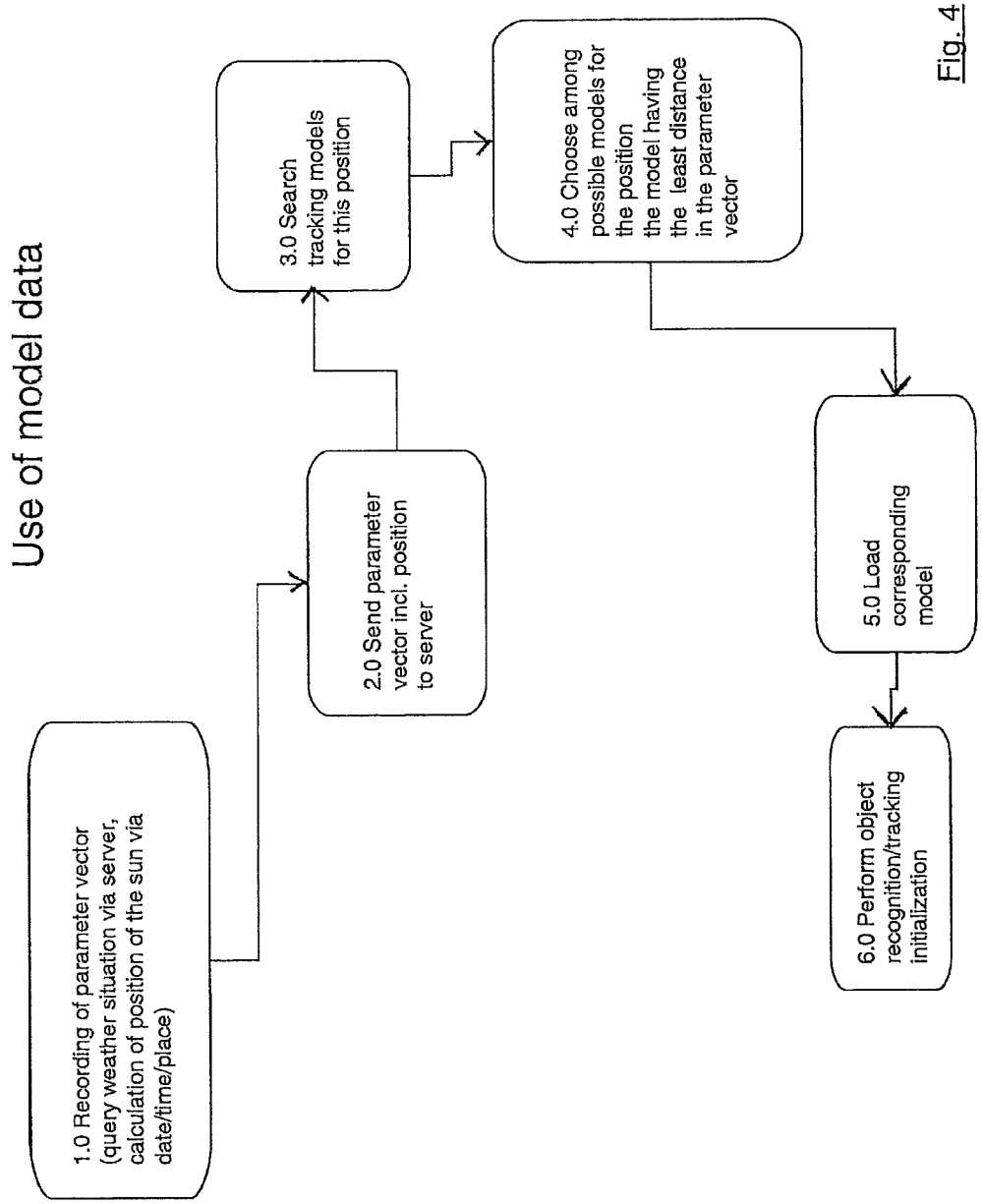
FIG. 4 shows an exemplary course of a method according to an embodiment of the invention.

FIG. 4 firstly relates to an embodiment of a method according to the invention, concerning the use of model data. In step 1.0, a parameter vector is recorded which basically comprises one or more parameters on the environmental situation (e.g. by querying the weather situation via a central server, calculation of the solar position by way of the date/time of the day/place. In step 2.0 the parameter vector inclusive of the recording position is sent to the server. In step 3.0, a search is effected for tracking models present for this position. From possible models for this position, there is selected in step 4.0 the model having the least distance in the parameter vector. Thereafter, the corresponding model is loaded in step 5.0. In step 6.0, the object recognition in the image of the camera or the tracking initialization for the pose determination of the camera is performed, depending on the particular application.

Figure 5:
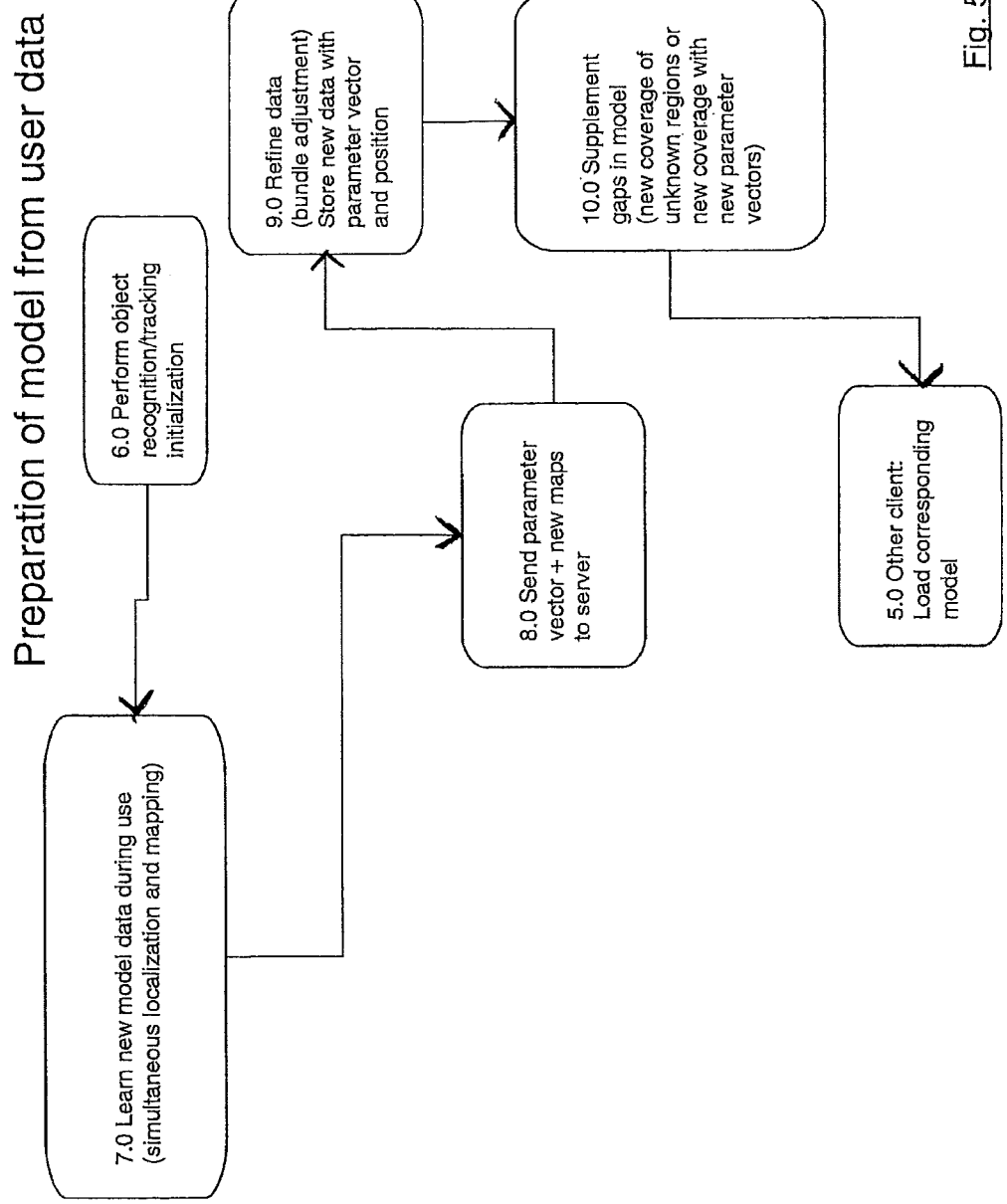
FIG. 5 shows an exemplary course of a method according to a further embodiment of the invention.

In FIG. 5, an exemplary method is performed that serves for preparing a data model from user data. In step 7.0, new model data are "learned" during use (simultaneous localization and mapping). In step 8.0, parameter vector and new maps (data models) are sent to the server. In step 9.0, there is an optional refining of the data (so-called "bundle adjustment"), with the new data being stored with the parameter vector and position. In step 10.0, gaps in the model are supplemented (e.g. new coverage of unknown regions or new coverage with new parameter vectors). In step 5.0, another client can then load a corresponding data model that was sent to the server by another user before, as described by way of steps 7.0 to 10.0. Instead of the other client, it is also possible that the same user or the same device, respectively, that has prepared the data model, loads the data model e.g. at a later moment in time.

Figure 3:
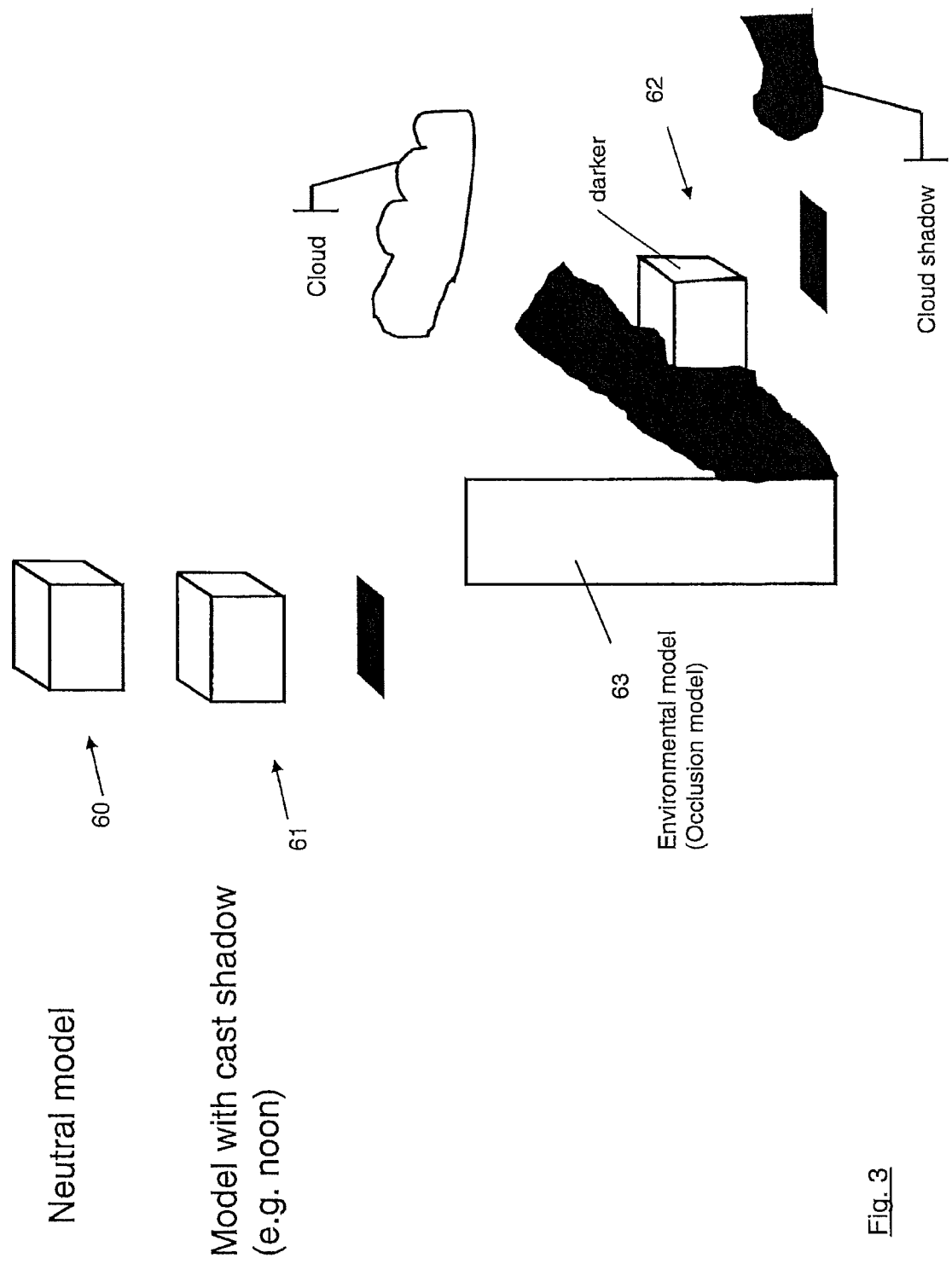
FIG. 3 shows schematic examples of data models for determining the camera pose or for object recognition.

FIG. 3 schematically shows how a data model can be prepared for a method for determining the camera pose or a method for object recognition. It can be started from a neutral model 60 containing a basic description of the real object (cp. object 41 in FIG. 2). Thereafter, various environmental situations are set or simulated, e.g. solar radiation from above. For the different environmental situations, a respective matched data model is provided in accordance with the respective at least one parameter, e.g. the matched data models 61 and 62 of FIG. 3, which each consider cast shadows in accordance with the environmental situation. It is advantageously possible to directly prepare from data models 61 and 62 in addition a somewhat compacter shape of a data model, which consists of a collection of prepared comparison data, for example a point-feature cloud. Data model 62 shows in exemplary manner that the closeness to reality of the data model generated can be further enhanced by additional measures. Thus, model 62 is not impaired by occlusion of additional known objects of the environment by shadows cast, but rather it is also possible to incorporate the current cloud situation, for example by a query of a current rain radar image.

Figure 6:
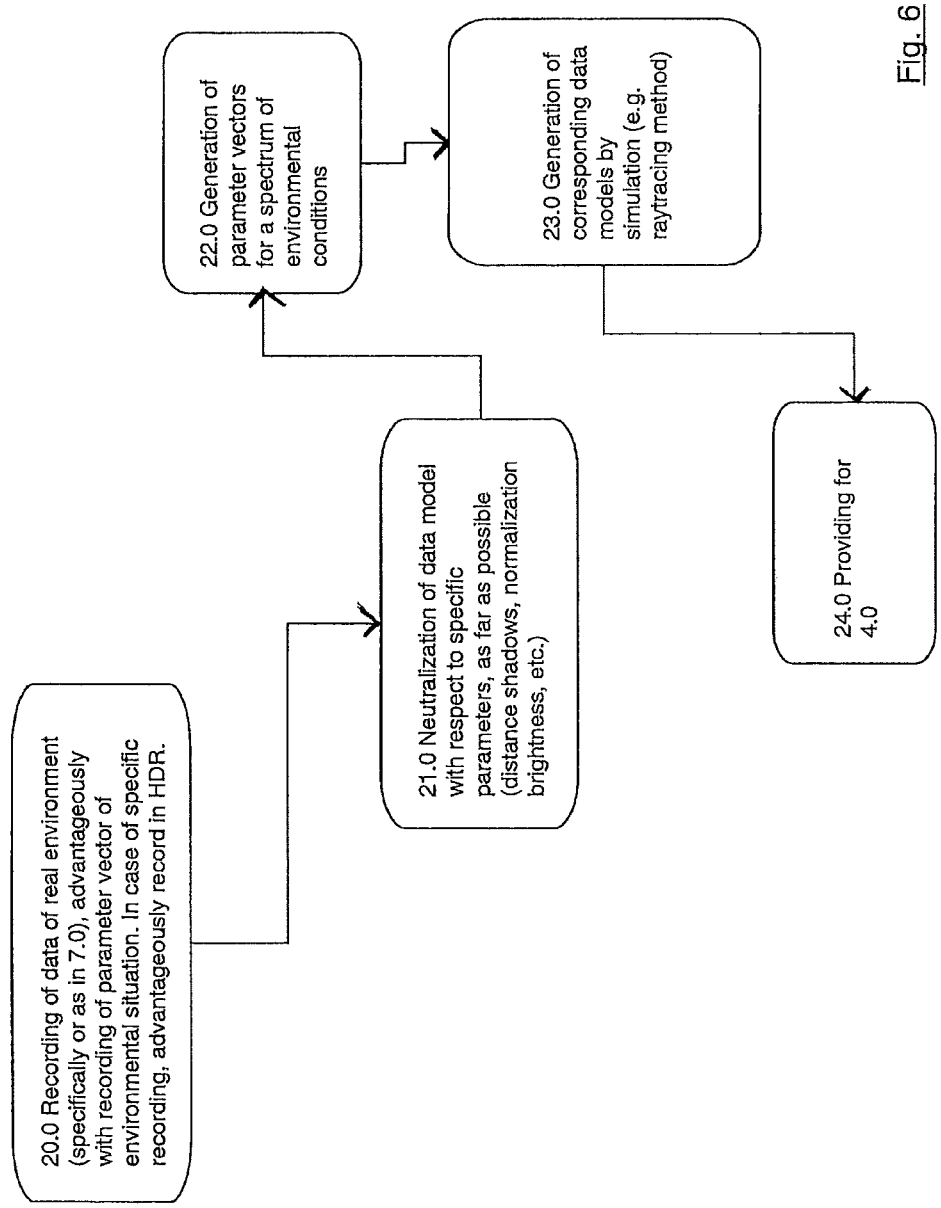
FIG. 6 shows an exemplary course of a method according to a further embodiment of the invention.

FIG. 6 illustrates an exemplary course of a method according to another embodiment of the invention. In step 20.0, data of the real environment are recorded (specifically or as in step 7.0), and in doing so, a parameter vector of the environmental situation is recorded advantageously. With specific recording, recording advantageously takes place in HDR (so-called "High Dynamic Range"). In step 21.0, neutralization of the data model is effected with respect to specific parameters as far as possible (e.g. removal of shadows, normalization of brightness, etc.). In step 22.0, parameter vectors are generated for a spectrum of environmental conditions. In addition thereto, it is possible in step 23.0 to generate corresponding data models by simulation (e.g. raytracing method). In step 24.0, provision is made for step 4.0 according to FIG. 4.

For increasing the degree of reality and thus improve association, weather data can be queried advantageously online. In this regard, there are various degrees of complexity conceivable for processing. On the basis of the weather situation (e.g. in accordance with the Google weather service "mostly cloudy", "isolated storms", "isolated rain"), there can be assigned fixed lighting models or materials (e.g. textures) that are matched to the weather situation. In the highest degree of complexity, however, it would also be possible to make use of a current cloud or rain satellite or radar image in order to dynamically prepare an approximated model of the cloud cover and to calculate therefrom the shadows cast and optionally the detailed light conditions (cf. also FIG. 3). As mentioned hereinbefore, this can be implemented by a server that makes available the data to the client in location-specific manner. Just as helpful for the perception of the distance is the determination of the visibility due to fog, rain or haze. This can be effected automatically (cp. "From video image e.g. Automatic Fog Detection and Estimation of Visibility Distance through use of an Onboard Camera)", magazine Machine Vision and Applications, publisher Springer Berlin/Heidelberg ISSN 0932-8092 (Print) 1432-1769 (Online), volume 17, number 1/April 2006, pages 8-20) or can be queried by means of current weather data as well.

The simplest technical realization, in addition to other known ones, is setting the fog adjustments in OpenGL. It is possible in addition, on the basis of the position, the date and the time of the day, to calculate the position of the sun and the moon, respectively, and to use the same for adjusting the light sources. This takes effect in particular on the shadows (cp. FIG. 3) that assist man in providing a better determination of the position of a virtual object (e.g. POI). The shadows may be pre-calculated textures (advantageously with a transparency value) which, in accordance with the position of the sun or the moon, are located underneath the POI on the ground plane where the straight line between sun or moon and POI intersects the ground plane (exceptions, if this is not so). Should sun or moon be visible simultaneously, the sun will be used for calculation.

As known in the prior art, the shadows however can be calculated dynamically as well. This may advantageously comprise the mutual shadowing of POIs. When a 3D model of the environment (e.g. in the form of an occlusion model 63 for occluding a real object; so-called "occlusion geometry") is present, this may be utilized in addition for realistic calculation of the shadow situation, in that it casts shadows e.g. on POIs (cf. also FIG. 3). The degree of reality of the matter blended in can be increased further by enriching the material by images of the environment of the POI. The use of so-called environment maps is known to those skilled in the art.

There may be taken another important step for strengthening the quality of the data model in accordance with the parameter place and orientation of the camera. By loading occlusion models (so-called "occlusion geometry"), it can be determined, whether comparison data are visible for the camera or disappear, for example, behind another building. The depth model can be deposited or can be generated dynamically by means of SLAM algorithms, stereo cameras or a time of flight camera. In that event, one item of depth information per set of comparison data (e.g. a SIFT feature) is sufficient. In a further step, the camera parameters are generated for correct superimposition in the near range (this does not have to take place continuously). These may be generated dynamically, for example, by means of a SLAM mechanism or can be retrieved from the server in accordance with the device name or can be deposited in the program.

In accordance with the hardware capacities of the system, it is possible to display and compute everything. In case the hardware of the system is weak, computing of the correct material surfaces can also be effected on the part of the server, or the overall image can be computed on the part of the server. With a strong system, a modern GPU (Graphic Processor Unit) can take over a large part of the work. To this end, there are numerous possibilities known to those skilled in the art.

By determining the position and orientation of the camera relative to the real environment, depth information with respect to at least one real object contained in the image can be calculated, and the depth information can be used for blending in, in the display device, an occlusion model for occluding a real object in case virtual information is occluded in the view by the real object to be occluded.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for recognizing an object of a real environment in an image taken by a camera, said method comprising the following steps:

taking at least one image of a real environment by means of a camera, the image containing at least part of a real object;

performing an image recognition method providing information as to the recognition of the at least one real object in the image;

determining at least one parameter of an environmental situation; and performing the image recognition method in accordance with the at least one parameter;

wherein a data model is used that is compared with data of the image of the real object in the image of the real environment; and wherein the at least one parameter has influence on one or both of the preparation or use of the data model.

2. The method of claim 1, further comprising providing correspondences between features associated with the real object and corresponding features of the real object as it is contained in the image of the real environment according to a result of the performed image recognition method, performing a tracking method that evaluates information with respect to the correspondences, so as to obtain conclusions about the pose of the camera.

3. The method of claim 1, wherein the step of determining the at least one parameter of the environmental situation uses one or more of items of information selected from the group consisting of: time of day, time of year, weather, in particular rain, clouds, sun and fog, position of moon, snow conditions, tree foliage, altitude above sea level, public events, in particular strong movements, traffic situation, position, orientation in a world coordinate system, histogram of image, temperature, or maintenance step.

4. The method of claim 1, further comprising starting a website in a web browser or an application according to a result of the performed image recognition method.

5. The method of claim 1, wherein the at least one parameter has an effect on minimum requirements with respect to successful retrieval of model data in the image, in particular determines a number of features associated with the real object, which are to be brought into conformity with corresponding features of the image of the real object in the image of the real environment.

6. The method of claim 1, wherein a parameter vector per data model or per feature within the data model is stored.

7. The method of claim 6, wherein the at least one parameter influences the kind of preparation of the data model, in particular influences the preparation of feature detectors and descriptors.

8. The method of claim 1, wherein the data model is extracted from a number of individual models, said data model containing an intersection of information present in several environmental situations.

9. The method of claim 1, wherein several partial systems respectively perform the method, wherein not each of the partial systems calculates a tracking situation itself, but finished situation information is made available to all partial systems, advantageously even a finished recognition or initialization model is made available to the partial systems.

10. The method of claim 9, wherein the partial systems provide information on the environmental situation to a server provided or to a peer-to-peer process.

11. A method for determining the pose of a camera relative to a real environment, said method comprising the following steps:
   taking at least one image of a real environment by means of a camera, the image containing at least part of a real object;
   determining at least one parameter of an environmental situation;
   performing a tracking method that evaluates information with respect to correspondences between features associated with the real object and corresponding features of the real object as it is contained in the image of the real environment, so as to obtain conclusions about the pose of the camera; and
   performing the tracking method in accordance with the at least one parameter;
   wherein, by determining the camera pose, depth information with respect to at least one real object contained in the image is calculated, the depth information being used to compute an occlusion model for a real object, when virtual information superimposed on the real environment is occluded in the view by the real object.

* * * * *